United States Patent
Punja et al.

(10) Patent No.: US 12,108,100 B2
(45) Date of Patent: *Oct. 1, 2024

(54) SYSTEMS AND METHODS FOR GENERATING ADAPTED CONTENT DEPICTIONS

(71) Applicant: Rovi Guides, Inc., San Jose, CA (US)

(72) Inventors: Deviprasad Punja, Bangalore (IN); Madhusudhan Srinivasan, Karnataka (IN); Alan Waterman, Merced, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,459

(22) Filed: Jul. 11, 2023

(65) Prior Publication Data

US 2023/0353803 A1  Nov. 2, 2023

Related U.S. Application Data

(63) Continuation of application No. 17/718,022, filed on Apr. 11, 2022, now Pat. No. 11,750,866, which is a (Continued)

(51) Int. Cl.
*H04N 21/25* (2011.01)
*G06N 3/044* (2023.01)
(Continued)

(52) U.S. Cl.
CPC ........... *H04N 21/251* (2013.01); *G06N 3/044* (2023.01); *G06N 3/08* (2013.01); *H04N 21/25883* (2013.01); *H04N 21/25891* (2013.01)

(58) Field of Classification Search
CPC .......... H04N 21/251; H04N 21/25883; H04N 21/25891; H04N 21/258; H04N 21/25866;
(Continued)

(56) References Cited

U.S. PATENT DOCUMENTS 11,330,315 B2  5/2022  Punja et al.
11,750,866 B2  9/2023  Punja et al.
(Continued)

*Primary Examiner* — Yassin Alata
(74) *Attorney, Agent, or Firm* — Haley Guiliano LLP

(57) ABSTRACT

A method for generating a content depiction of particular content that includes a machine learning system programmed to receive profile data representing preferences for content. The machine learning system identifies preferences for content features based upon the profile data, accesses content data representing the particular content and other content, and classifies features of the content data and content structure data within a content structure database system according to content categories. The machine learning system generates a content structure depiction of the particular content by combining content structure data from the content structure database system, wherein the combining is based upon correlating the identified preferences of the profile with the classified content categories. The machine learning system receives feedback data responsive to the content depiction and reprograms a configuration of the machine learning system for generating a content depiction based upon the feedback data.

20 Claims, 7 Drawing Sheets

Related U.S. Application Data continuation of application No. 16/838,688, filed on Apr. 2, 2020, now Pat. No. 11,330,315.

(60) Provisional application No. 62/979,785, filed on Feb. 21, 2020.

(51) Int. Cl.
*G06N 3/08* (2023.01)
*H04N 21/258* (2011.01)

(58) Field of Classification Search
CPC ......... H04N 21/26603; H04N 21/4312; H04N 21/44204; H04N 21/44213; H04N 21/44222; H04N 21/4532; H04N 21/466; H04N 21/4666; H04N 21/8146; G06N 3/0445; G06N 3/08
See application file for complete search history.

(56) References Cited

U.S. PATENT DOCUMENTS

| | | |
|---|---|---|
| 2006/0212444 A1 | 9/2006 | Handman et al. |
| 2016/0381420 A1 | 12/2016 | Blohowiak et al. |
| 2018/0181566 A1 | 6/2018 | Lee et al. |
| 2018/0293713 A1 | 10/2018 | Vogels et al. |
| 2019/0147321 A1 | 5/2019 | Miyato |
| 2019/0377955 A1* | 12/2019 | Swaminathan .. H04N 21/23418 |
| 2020/0213680 A1 | 7/2020 | Ingel et al. |
| 2021/0266619 A1 | 8/2021 | Punja et al. |
| 2021/0266637 A1 | 8/2021 | Punja et al. |
| 2022/0239965 A1 | 7/2022 | Punja et al. |

\* cited by examiner

SYSTEMS AND METHODS FOR GENERATING ADAPTED CONTENT DEPICTIONS

CROSS-REFERENCE TO RELATED APPLICATIONS

This application is a continuation of U.S. application Ser. No. 17/718,022, filed Apr. 11, 2022, which is a continuation of U.S. application Ser. No. 16/838,688, now U.S. Pat. No. 11,330,315, filed Apr. 2, 2020, which claims priority to U.S. Provisional Application No. 62/979,785, filed Feb. 21, 2020. The contents of which are hereby incorporated by reference herein in their entireties.

BACKGROUND

The present disclosure relates to systems and processes for generating image depictions of content based upon profiled preferences.

SUMMARY

Depictions (e.g., posters, images) of content (e.g., movies) are commonly utilized to publicize and attract consumption of the content. Consumers with different consumer profiles may be attracted to content based upon different factors. For example, some consumption is based upon preferences toward comedic content, romantic content, action content, and/or particular actors (including their attributes). In one approach, a limited selection of depictions of the content is manually generated and distributed in order to attract and maximize consumption based upon a large, generalized set of consumer profiles. For example, on movie poster may be manually created for children and one for adults. In another example, one movie poster may be manually created for distribution in North America, and one for distribution in China. However, such manual creation of images representing content is expensive and time consuming because each image needs to be created manually. Furthermore, some users may not be attracted to any of the elements of generalized content depiction or may even be repelled by all or parts of the depictions. For this reason, such broad targeting is often ineffective because, for example, not every consumer in North America will have the same preferences. Thus, more effective systems and methods are needed for distributing exemplary depictions (e.g., posters) of content tailored to particular user profiles.

In some embodiments, machine learning (ML)/artificial intelligence (AI) methods and systems are implemented to generate content depictions (e.g., images/posters) based upon user profiles, metadata pertaining to the content being depicted, content structures and features (e.g., images extracted from the depicted content and/or other content) and related metadata. In an embodiment, a machine learning system is programmed to process and interpret user profiles (e.g., content browsing history, prior content consumption, social media patterns, etc.) into classifications of features and levels of preference for different kinds of features of content (e.g., particular actors or attributes of actors, scenery, comedic content, romantic content, action-based content, etc.) and utilizing a store of related feature depictions (e.g., images) from the content being depicted and/or other content (e.g., including images of the preferred actor(s), scenery, etc.) and generating a new depiction (e.g., image/poster) that may be distributed with respect to a particular user profile (e.g., an online user account).

After a depiction is distributed, data may be collected that is related to responses to the distribution (e.g., consumption history by user accounts to which the generated depictions were distributed to). This data may be received by the ML system, with which it may retrain its programming to further optimize output and subsequent outcomes (e.g., to increase consumption of content). For example, the ML may correlate a greater responsiveness by a particular user (or type of user) profile with certain features of the generated depictions (e.g., certain backgrounds, actors, etc.). As the ML system receives more feedback, it continues to "learn" and reprogram itself to optimize how to generate depictions and maximize outcomes (e.g., consumption). It's store (e.g., images) of features of content may also grow and certain features may be emphasized based upon the "learning."

In some embodiments, the ML system includes a neural network with which it learns patterns and determines outputs (depictions). The neural network may include multiple nodes related to particular features of content and of user profiles. Connections between these nodes and the strengths of these connections may be programmed based upon historical metadata of user profiles as the data pertains to the preference for particular classified features of content. The neural network may learn to generate new nodes and connections based upon new data it receives and and/or based upon outcome data collected after content depictions are generated and distributed.

In some embodiments, a neural network is a generative adversarial network (GAN). The GAN may include a discriminator module that compares a generated depiction/image with "authentic," approved, and/or previously distributed images/depictions. If the discriminator fails to "pass" the depiction, factors pertaining to the failure may be fed back into the ML system in order to improve or modify the depiction to more closely represent an approved or authentic depiction. For example, the "discriminator" module may determine if the features included in the generated depiction flow together naturally (e.g., an actor's depicted proportions are not oversized compared to an object or background scene in the depiction). In addition, the "discriminator" module itself may also be reprogrammed and/or modified via feedback loop. In some embodiments, both the ML system and the "discriminator" module may be fine tuned in parallel.

A machine learning system may include a natural language processor (NLP) to interpret collected metadata pertaining to a user's account profile and/or content profile. For example, an NLP may interpret posts on a social media site which reflect that the user profile has a tendency to favor ocean scenes, car crashes, particular food items, etc. . . . . Likewise, an NLP may be used to interpret particular features of content (vocabulary) or its metadata with particular situations or themes (e.g., comedic, romantic, or hostile).

In some embodiments, the ML system utilizes deconstructed segments or features of content in order to learn which features/segments of the content are associated with particular themes, characters, scenes, etc. and/or for generating a content depiction tailored to a particular user profile or collection of user profiles. These segments/features may be classified as a content structure based on a content segment or other feature of content.

A content structure may include objects, where each object includes a set of attributes and corresponding mappings. For example, a movie may be deconstructed into a plurality of objects each having their own respective attributes and mappings. These structures may be assigned particular attributes that also correlate (e.g., to different levels of degree) to attributes of particular user profiles. The ML system may then identify a correlated structure and use it to generate a depiction or a part of a depiction of content tailored to a particular user profile. Exemplary content structures that can be used for generating new content structures and rendered into a content depiction are described by co-pending application Ser. No. 16/363,919 entitled "SYSTEMS AND METHODS FOR CREATING CUSTOMIZED CONTENT", filed on Mar. 25, 2019 ("'919 Application"), which is hereby expressly incorporated by reference herein in its entirety.

Generation of the tailored content structures and/or images helps overcome the limitations of generalized depictions for large audiences described above. For example, a user receiving content depictions tailored to their profile or similar profiles according to some embodiments will be apprised of the content features which match their preferences and thus is more likely to further consume the content being depicted. Generation will also be less time consuming, user intensive, and likely more predictive of positive outcomes than manual generation.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
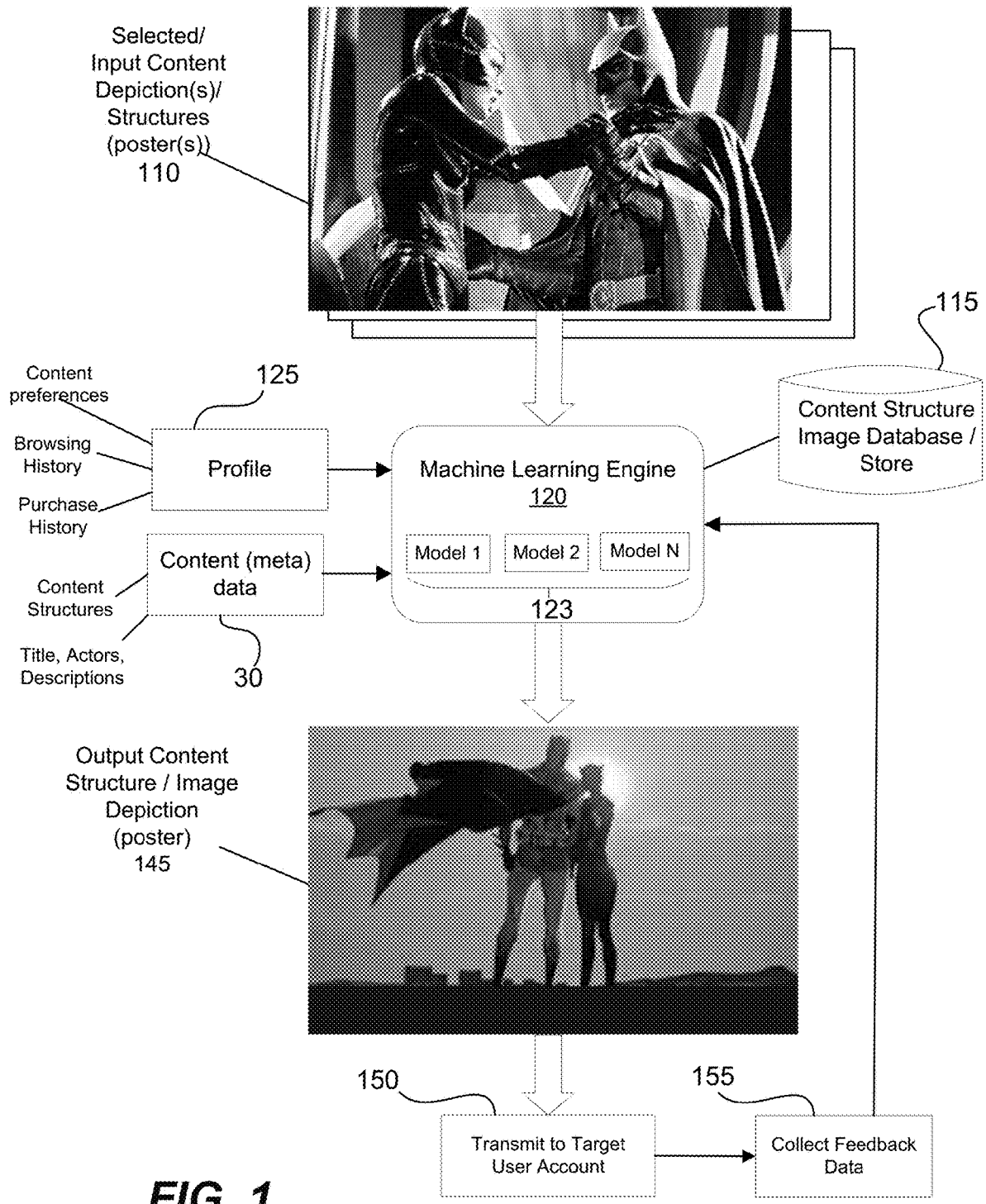
FIG. 1 shows an illustrative flowchart of a machine learning system for generating tailored content depictions according to some embodiments of the disclosure.

In some embodiments of the present disclosure, a machine learning system utilizes profile input, content input, and a data store of content structures (e.g., content images, descriptions, etc.) to generate a content depiction tailored to the profile input. FIG. 1 shows an illustrative flowchart of a machine learning system for generating tailored content depictions according to some embodiments of the disclosure. A machine learning engine 120 receives profile data 125 for which a content depiction 145 is generated. Profile data 125 can include content preferences, browsing history, and purchase history, such as may be collected in relation to an online account or profile.

Machine learning engine 120 also receives and/or has access to content data, including image data and content structure data relating to a particular content which is being depicted. Content data can include, for example, meta data identifying the title, actors, script, viewership, and other data pertaining to the depicted content or other content. Content structure data can include content structures defined by objects deconstructed from the content itself. The content structures may include attribute tables with attributes, such as, for example, the height, race, age, gender, hair color, eye color, body type, a facial pattern signature, a movement pattern, a relative location with other objects, an interaction with other objects, and/or the like. The attributes may be stored in an attribute table as a listing of data field names in the content structure. The attributes may also have associated mappings. Generation of such content structure may be performed, e.g., by deconstructing an existing content segment. Deconstruction of content segment and storage of resulting content structures is further described, for example, in the '919 Application referenced above.

Machine learning system 120 also receives sample depictions 110 from/with which to base and compare generated depiction 145. These sample depictions 110 may include already generated and authenticated/approved depictions. Machine learning system 120 utilizes the input data as well as a database system 115 of image data to generate a new depiction 145. The image data may include images and their attributes (e.g., particular actors, backgrounds, scenes, locations, objects, etc.). The image data may have been previously programmed into the database system 115 or obtained from content data 130 and sample depictions 110.

Machine learning system 120 generates a new content depiction 145 of a content by combining and modifying elements of image data from content data 130 and/or content depictions 110 based upon profile data 125 and content data 130. The machine learning system 120 is trained and programmed to combine and/or modify image data to reflect determined content preferences associated with profile 125. Machine learning system 120 may include one or more machine learning models 123. These models may employ, for example, linear regression, logistic regression, multivariate adaptive regression, locally weighted learning, Bayesian, Gaussian, Bayes, neural network, generative adversarial network (GAN), and/or others known to those of ordinary skill in the art. Multiple models may be used with results combined, weighted, and/or otherwise compared in order to determine an output depiction 145.

Preferences associated with profile 125 may be determined such as by correlating profile data (e.g., browsing history, content preferences) with particular attributes of images (e.g., particular actors, actor attributes, themes of action, romance, comedy, etc.). For example, the machine learning system may determine that the profile consumes content (e.g., movies, television programs) with attributes of comedy to a greater degree than content with attributes of action or drama, The machine learning system 120 can, for example, analyze data (e.g., credits, reviews, scripts) associated with the consumed content that may be retrievable from local (e.g., local database systems) or online sources (e.g., websites) and include key words (e.g., "comedy," "funny," "hilarious") that the system has been programmed or "learned" to ascribe with particular attributes (e.g., themes of comedy). In some embodiments, the machine learning system utilizes a natural language processor (NLP) to analyze the data and extract attributes of the content.

The machine learning system 120 may use one or more of content depictions 110 as a reference depiction. These may include presently approved/active depictions associated with the content and the attributes associated with the depictions (e.g., actors, scene description, background, location, etc.). The machine learning system 120 may then tailor a reference depiction 110 or generate a substantially new depiction based upon the determined preferences associated with the profile 25. For example, the machine learning system 20 may determine that most of the attributes of a content depiction 110 correspond to preferences of the profile 125 and thus may either minimally or decline to modify a selected content depiction. For example, the machine learning system 120 may simply substitute the background image of a depiction with a background image from the image database 115 with attributes (e.g., outdoor daytime scene) that more closely correspond to the preferences of profile 125.

In some embodiments, the machine learning system 120 may generate a substantially new depiction (e.g., an image or content structure that represents an image) utilizing image data/content structure data from image database system 115. For example, when a particular profile predilects to romance themes, and the selected depictions 110 include relatively little if any attributes of romance, the machine learning system 120 may pull images/content structure from image/content structure database 115 of two actors associated with the content and superimpose their images/content structure in an embrace over a background image/content structure with romantic attributes (e.g., as further shown in FIG. 8).

Once a depiction 145 has been generated, it may be transmitted at block 150 to a destination associated with profile 125 (e.g., for display in a webpage downloaded using a browser using a "cookie" linked to the profile). The destination may include devices for personal displays of content (e.g., streaming media, live television) linked to profile 125. For example, a user associated with profile 125 may login to a streaming or live content account or service (e.g., Tivo Edge™ for Cable, Amazon Prime Video, Xfinity Cable, etc. . . . ). During a broadcast of content using the associated device and/or service, an interval between or during periods of content delivery may include display of the generated depiction and may include providing information or an interface for accessing (e.g., viewing/recording) content (e.g., streaming/live broadcast content) associated with the depiction.

After transmission of content depiction 145 at block 150, feedback data (e.g., metadata) may be collected at block 155 in connection with its transmission. Data reflecting consumption of the content (e.g., consumption in response to or proximate to the display of the content depiction) may be collected and transmitted back to the machine learning engine 120. For example, a Tivo Edge™ device may be programmed to store records of consumption of the content before and immediately after display of the generated content depiction and also consumption of the content in response to other content depictions and/or consumption of content absent a proximate display of any content depiction.

After receiving the feedback data collected at block 155, machine learning system 120 may use the feedback data to further program itself for purposes of generating further content depictions. For example, machine learning system 120 may correlate certain content depictions or aspects thereof with greater consumption of the content by specific profiles or profiles with particular characteristics (e.g., predilections for romance, action, etc.).

Figure 2:
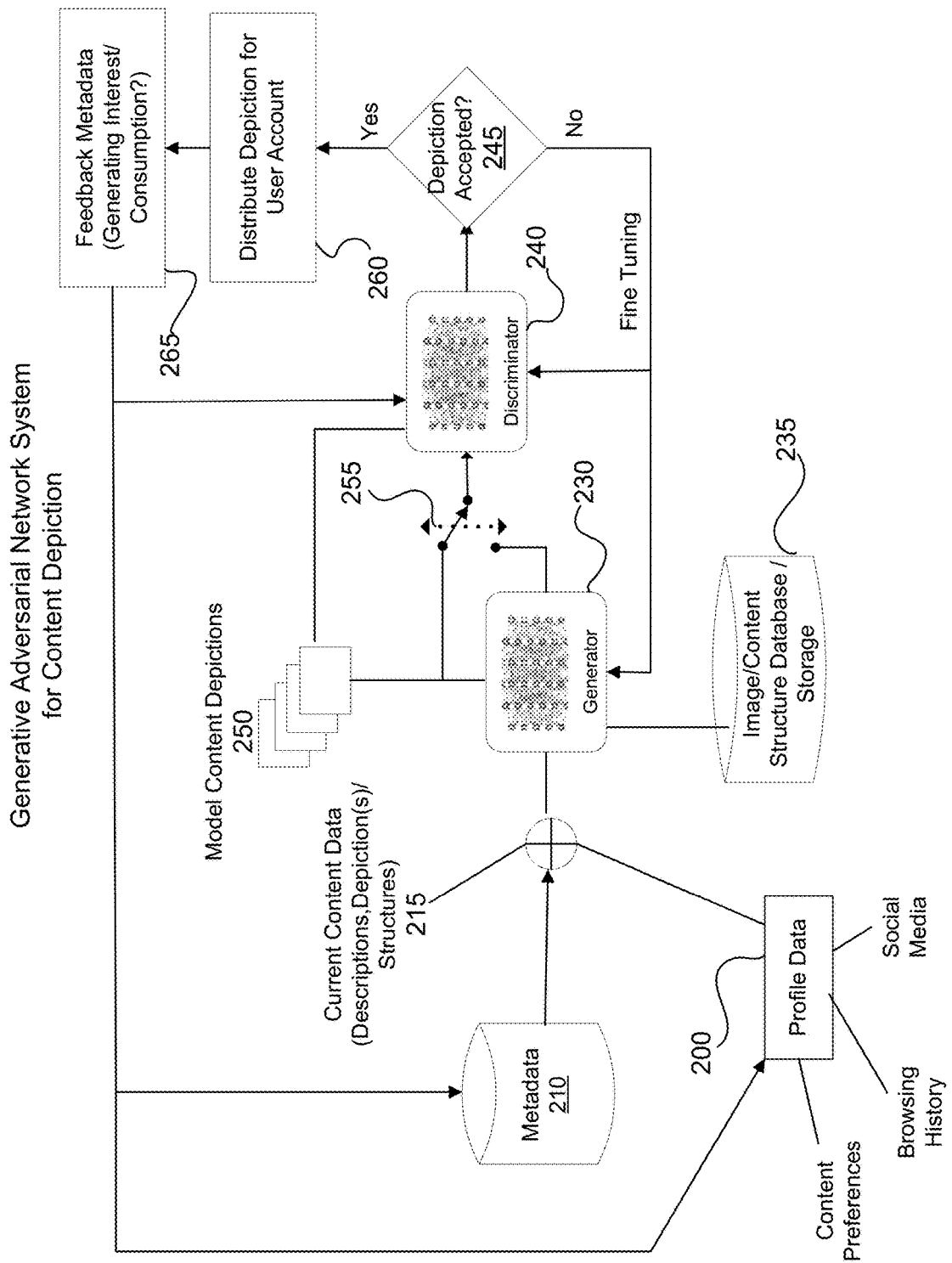
FIG. 2 shows an illustrative flowchart of a generative adversarial neural network machine learning system for generating tailored content depictions according to some embodiments of the disclosure.

FIG. 2 shows an illustrative flowchart of a generative adversarial neural network (GAN) machine learning system for generating tailored content depictions according to some embodiments of the disclosure. A content depiction generator 230 network module receives data 215 for a particular content, profile data 200, and collected metadata 210 pertaining to the particular content and other content. Data 215 may include data describing the content including, for example, its actors, themes, story summary, etc. Data 215 may also include content structures such as described herein including content objects that may be used to generate the content or variations thereof. Data 215 may include content depictions, content structures, and images from which new depictions may be based as described herein.

Collected metadata 210 may include, for example, content consumption statistics for the content to be depicted and/or other related content. For example, the metadata 210 may include data pertaining to the actors of the content, their relative popularity, the success of particular content they have been involved in, the success of particular content depictions related to the content, and other data that may be used to tailor a content depiction using generator module 230.

Profile data 200 may include content preferences and consumption history associated with a particular profile. Profile data 200 may include internet browsing history, social media posts, content "likes" or "dislikes," and other data that may be analyzed by generator 230 to determine content preferences associated with a profile such as further described herein.

Generator module 230 may also be programmed to generate tailored content utilizing a store 235 of image data and model content depictions 250. Such as described with respect to FIG. 1, image data may include images of particular actors, backgrounds, scenes, objects, etc., and their attributes. Content depictions 250 may include previously generated and approved (model) content depictions.

Generator module 230 includes a neural network of nodes and node connections programmed to determine and generate a tailored content depiction based upon content data 215, profile data 200 and metadata 210. An exemplary network of nodes and connections is shown and described with respect to FIG. 3. The nodes and connections, store 235 of images, and model depictions 250 may be pre-programmed to a certain level as a basis for generating initial content depictions. As will be described further, generator module 230 is programmed to generate new nodes and connections for content depiction generation based upon feedback and fine tuning from block 265 and a discriminator module 240. Discriminator module 240 may include a neural network which is programmed with nodes and connections to discriminate between passable depictions and those that fail discrimination.

Generator module 230 may pre-process profile data 200 and metadata 210 to determine particular preferences associated with a profile. For example, generator module 230 can compare content consumption history provided in profile data 200 to metadata 210 or content data 215 relating to the content consumed (e.g., keywords, actors, descriptions of the content) to determine a profile preference for particular content attributes. Profile data 200 may also include predetermined profile preferences.

Using determined profile preferences and content data as an input, a neural network of generator 230 operates to modify an existing content depiction or generate a new depiction from various image data elements from image data store 235. For example, an input reflecting a high degree of preference for a particular content attribute (e.g., a particular actor or content theme) may cause the neural network to apply a node and strong connection for incorporating an image/content structure attribute with that particular attribute (e.g., an image/content structure of a particular actor or content backdrop). The neural network may utilize numerous such nodes and connections balanced against each other to modify or create a depiction with various attributes.

After a depiction is generated by generator 230, discriminator module 240 compares the generated depiction to one or more model content depictions 250 at 255. The discriminator 240 may apply analysis and comparisons, including the use of a neural network, to determine if the generated depiction satisfies particular criteria pertaining to authentic/approved content depictions. Analysis/comparisons may include, for example, determining whether features (e.g., images/content structures of actors, objects, backgrounds) sufficiently resemble features of the model depictions. Various image/content structure processing functions (e.g., facial/object recognition, pattern matching) may be employed to perform the analysis/comparisons. Based upon the analysis/comparisons, a determination is made about whether the generated depiction satisfies the criteria/comparisons to a sufficient degree at block 245.

If, at block 245, the generated depiction doesn't satisfy the tests performed by discriminator 240 and/or other examinations/criteria (e.g., approval/rejection through an external process/operator), feedback data regarding the rejection may be received by the generator 230 and the discriminator 240. Feedback data may include, for example, rejections of particular identified actors, scenes, backgrounds, and/or objects within the content depiction. Feedback data may include data indicating attributes that should be introduced, removed, and/or modified in the depiction. Based upon the feedback, generator module 230 may generate/modify a content depiction and again output the newly generated depiction for further processing by discriminator module 240. The cycle may continue until a satisfactory depiction is generated and/or a particular threshold of rejections is exceeded.

At block 260, the generated depiction is distributed such as across a computer network and to a content platform. In some embodiments, the depiction is distributed in a manner that is linked with a particular account profile (e.g., a content distribution platform linked to the profile) or type of profile. As described herein, the feedback data pertaining to the distribution of the depiction and related content consumption may be collected and received at block 265 and used to update metadata store 210 and/or profile data 200. The feedback data may be fed back into generator module 230 or discriminator module 240 and result in reprogramming of the generator 230/discriminator 240 such as based upon analysis of the generated depiction(s), related content consumption, and profile data.

Figure 3:
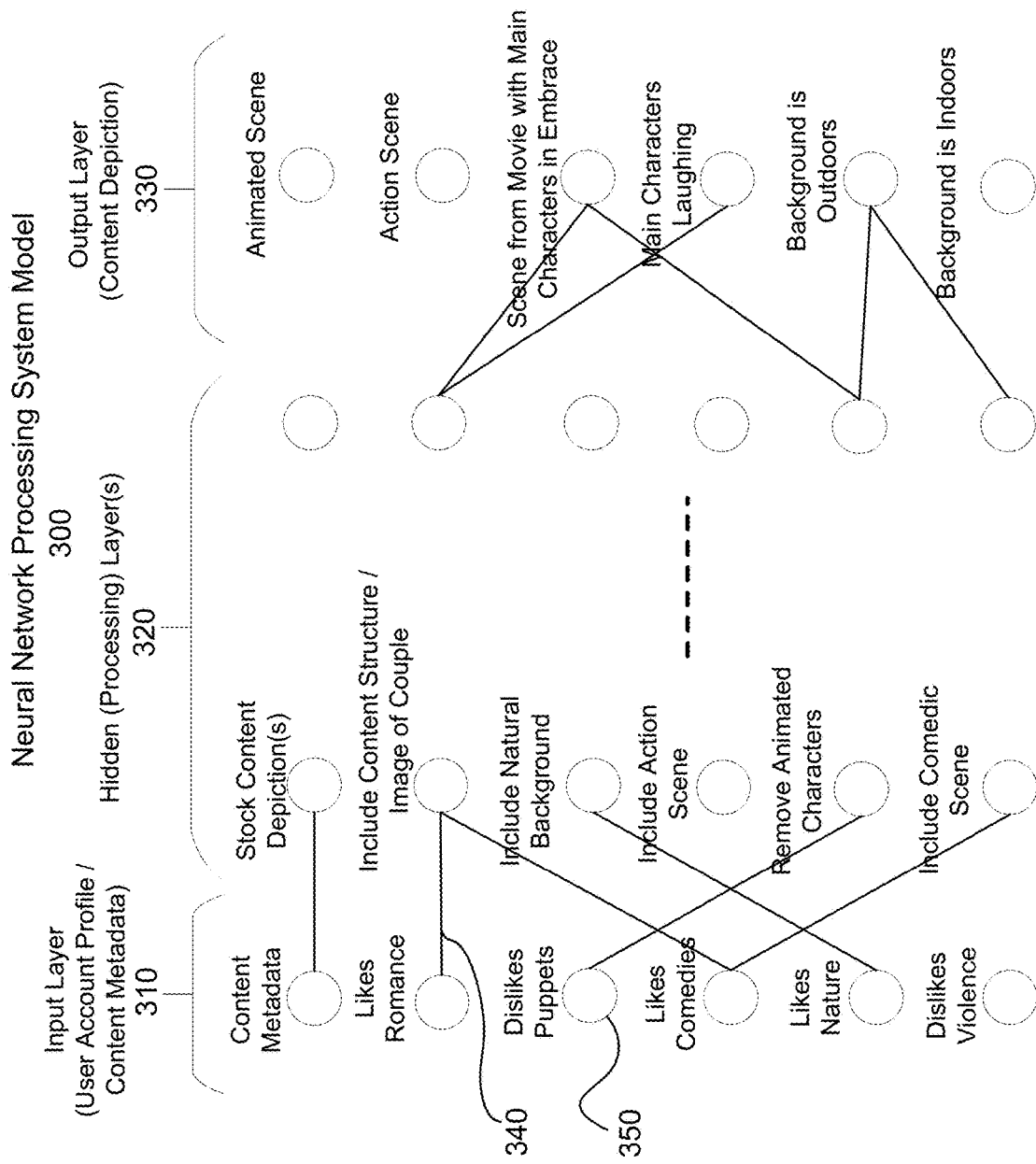
FIG. 3 shows an illustrative diagram of a neural network model node array according to some embodiments of the disclosure.

FIG. 3 shows an illustrative diagram of a neural network model node array 300 according to some embodiments of the disclosure. An input layer 310 may include various input nodes 350 matched to particular profile attributes (e.g., particular types of content preferences). The input nodes may also include inputs to various image data, content structures, and content data. These input nodes may be connected, designated by varying degrees of connection strength, to other nodes within a processing layer 320 of nodes. The processing layer 320 of nodes directs the neural network to modify or generate a content depiction based upon connections to the input layer and to other nodes within the processing layer 320. The processing layer processes the input depending on the current state of the network's adaptive programming. The processing layer may have direct access to an image/content structure data store (e.g., data/content structure store 235 of FIG. 2) from which image data is used to generate and/or modify content depictions. Model node array 300 may be used within a neural network generator module such as generator module 230 of FIG. 2.

Based upon the processing in the processing layer 320, an output depiction is generated through the output layer 330. The output layer 330 produces an output content depiction with various attributes determined through the input and processing layers 310 and 320. The output depiction may be further forwarded to a discriminator module (e.g., module 240 of FIG. 2) and/or distributed such as further described herein. After a depiction is forwarded to a discriminator and/or distributed, the neural network may be (re-)programmed based upon feedback received in response. For example, feedback data may indicate a greater relative positive response (e.g., consumption of content) from particular profile types to particular image/content structure attributes. The neural network may thus be reprogrammed to strengthen a connection (association) between a particular profile and image/content structure attribute.

Figure 4:
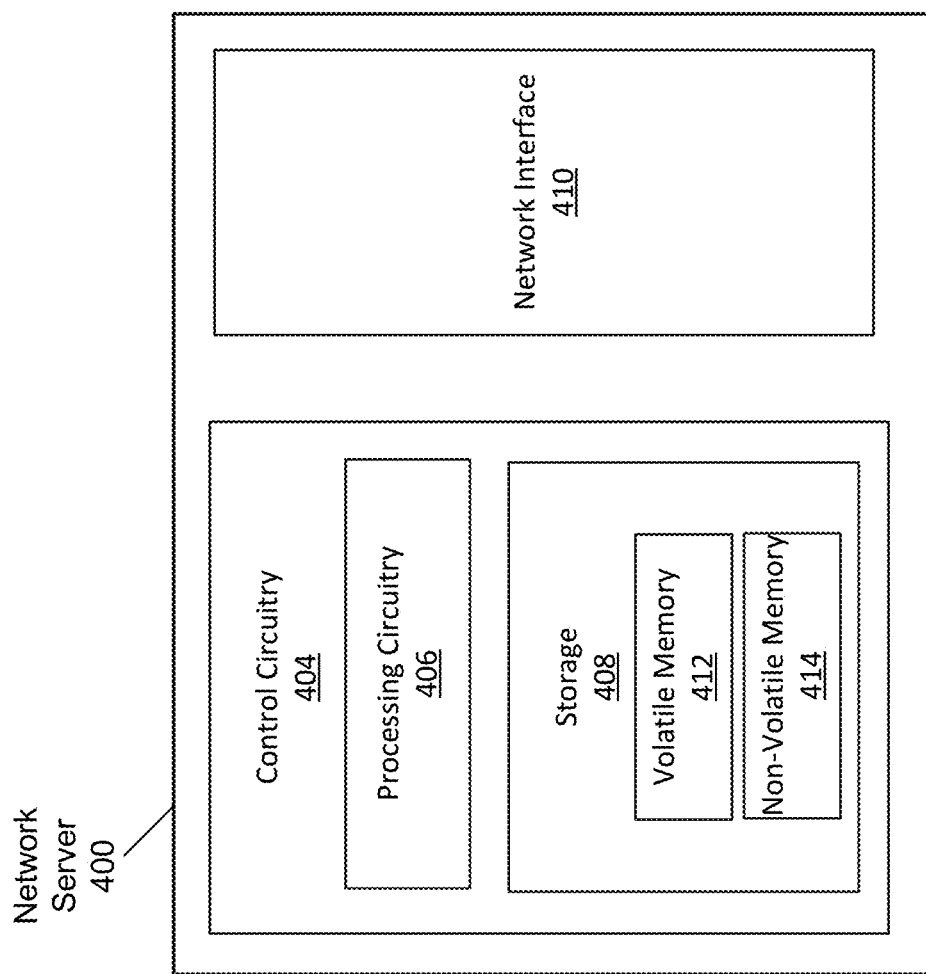
FIG. 4 is a diagram of an illustrative device for generating content depictions in accordance with some embodiments of the disclosure.

FIG. 4 is a diagram of an illustrative device 400 used for generating, distributing, and displaying content depictions in accordance with some embodiments of the disclosure. A system for generating and distributing content depictions may include, for example, servers, data storage devices, communication devices, display devices, and/or other computer devices. Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 406 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 410 may be used to communicate with other devices in a machine learning system (e.g., an image database system 15 of FIG. 1) or with devices to which content depictions are distributed (e.g., content servers or content display devices).

In some embodiments, control circuitry 404 executes instructions for execution of a machine learning system stored in memory (i.e., storage 408). The instructions may be stored in either a non-volatile memory 414 and/or a volatile memory 412 and loaded into processing circuitry 406 at the time of execution. A system for generating content depictions (e.g., the systems described in reference to FIGS. 1, 2, and 3) may be a stand-alone application implemented on a media device and/or a server or distributed across multiple devices in accordance with device 400. The system may be implemented as software or a set of executable instructions. The instructions for performing any of the embodiments discussed herein of content depiction generation may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes of FIGS. 5, 6, and 7 may be stored in storage 408, and executed by control circuitry 404 of device 400.

Figure 5:
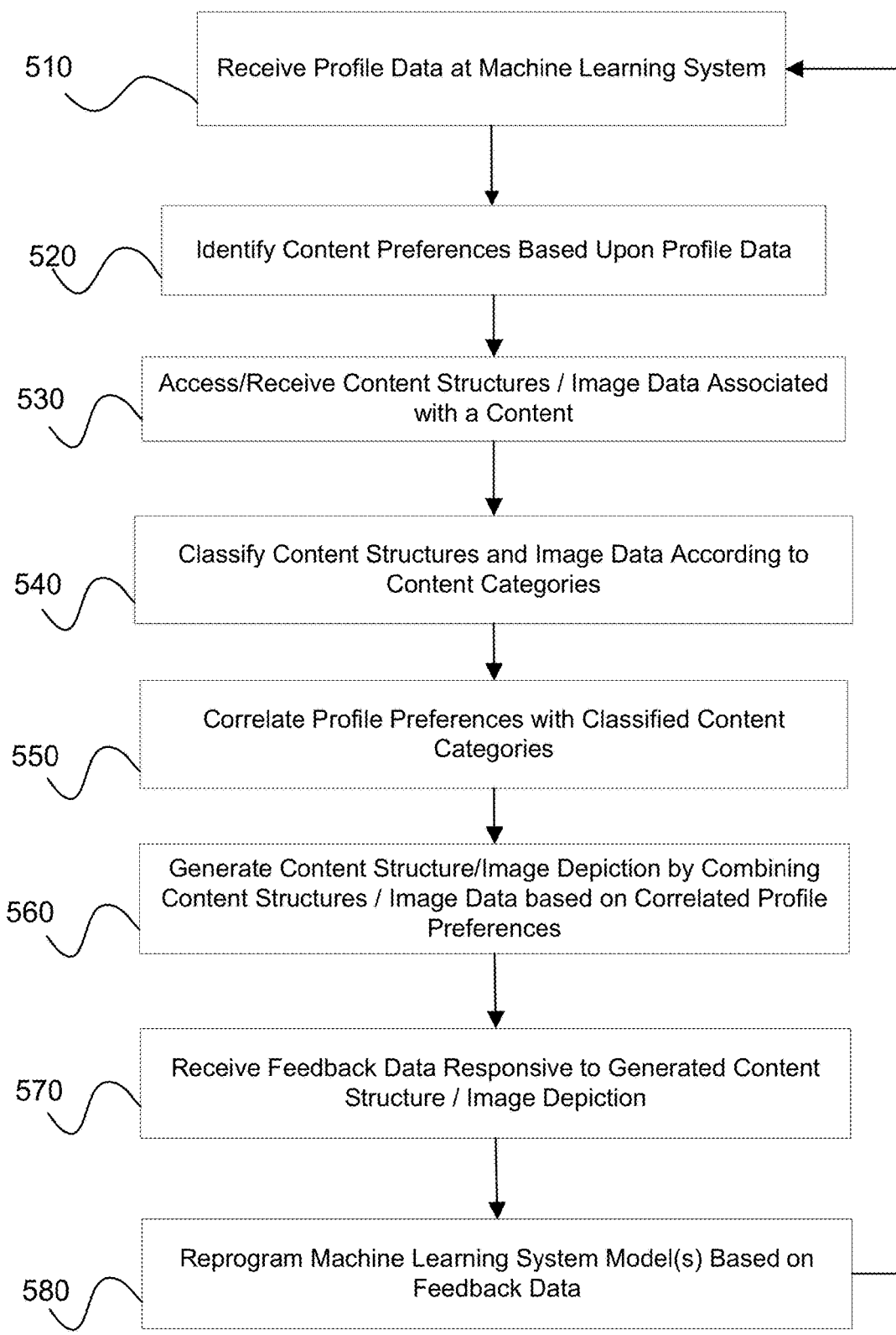
FIG. 5 shows an illustrative flowchart of a process for generating content depictions in accordance with some embodiments of the disclosure.

FIG. 5 shows an illustrative flowchart of a process for generating content depictions in accordance with some embodiments of the disclosure. At block 510, profile data is received at a machine learning system (e.g., machine learning system FIGS. 1 and 2). As described herein, profile data can include content preferences, browsing history, content consumption history, and social media history. At block 520, profile preferences are identified such as based upon analyzing the profile data. A set of resulting profile preference inputs is then further processed by the machine learning system for generating an output depiction.

At block 530, the machine learning system receives and/or accesses content structures and/or image data associated with a content to be depicted or related to other content. At block 540, the machine learning system may classify the received/accessed content structures and/or image data according to content categories. In some embodiments, accessed content structures and/or image data may already be classified within the machine learning system. For example, images and/or content structures of particular actors, objects, background scenes, etc., may be accessible within an image database and/or a content structure store (e.g., image/content structure database store 15 of FIG. 1).

At block 550, the machine learning system may use one or more trained models for correlating profile preferences with content structures, images, or image features. These models may employ, for example, linear regression, logistic regression, multivariate adaptive regression, locally weighted learning, Bayesian, Gaussian, Bayes, neural network, generative adversarial network (GAN), and/or others known to those of ordinary skill in the art. Multiple models may be used with results combined, weighted, and/or otherwise compared.

At block 560, the model(s) are utilized to generate a content structure/image depiction of identified content based upon the profile preferences and correlated content structures, images, and/or image/content structure features as further described herein. The resulting content structure/image depiction may be further analyzed and/or modified, and/or the model(s) reprogrammed, such as described with respect to the GAN of FIG. 2. The generated depiction may be in the form of an image and/or a content structure represented by one or more objects (e.g., images, image attributes, vector graphic commands, etc.) that can be employed or converted for example, to generate an image depiction. After generation, the depiction may be distributed such as to a target audience (e.g., an account associated with the profile) and may be presented in the context of a promotion or link to consumption of content associated with the content depiction (e.g., by way of a web page or content guidance/selection/viewing system). An image depiction or an image based upon the generated content structure depiction may be created for display on a screen to a target audience such as using the techniques described in the '919 Application. Image conversion from the content structure/depiction may occur in whole or part using devices including those which are used to generate the content structure/depiction and device(s) from which the image is displayed.

At block 570, in response to distribution of the content depiction at block 560, feedback data may be collected. The feedback data may include consumption of content, ratings, and/or social media posts pertaining to the content depiction structure and image depictions generated therefrom. At block 580, the model(s) of the machine learning system may be reprogrammed based upon the feedback such as to improve correlation and generation of content depictions that induce increased content consumption as further described herein. After reprogramming, the machine learning system may receive further profile data at block 510 for generating a new depiction based upon the reprogramming.

Figure 6:
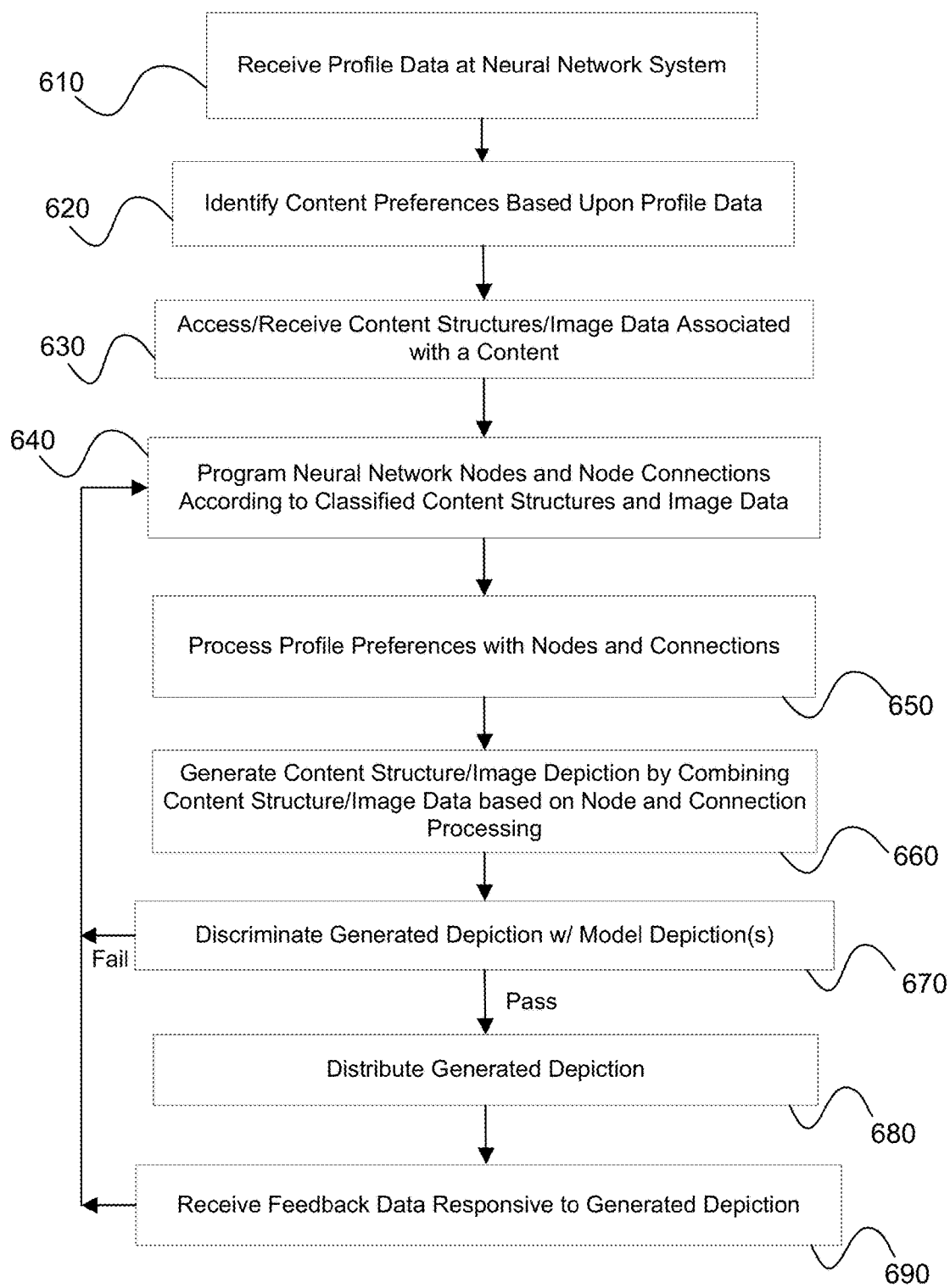
FIG. 6 shows an illustrative flowchart of a neural network process for generating content depictions in accordance with some embodiments of the disclosure.

FIG. 6 shows an illustrative flowchart of a neural network process for generating content depictions in accordance with some embodiments of the disclosure. At block 610, profile data reflecting preferences of a profile (e.g., user account profile) is received at a neural network system such as described, for example, with respect to FIGS. 2 and 3. At block 620, content preferences for the profile are identified (e.g., based upon content consumption history, browsing history, social media posts, etc., such as further described herein.

At block 630, a neural network further accesses/receives content structures and/or image data that are or can be classified with particular attributes (e.g., particular actors, backgrounds, themes, etc.). For example, the neural network may utilize a deconstruction engine as described above to break down content into content structures and objects having particular attributes (e.g., as described in the '919 Application). At block 640, the nodes and connections of the neural network may be programmed (or reprogrammed) according to classified content structures and/or image data received or accessed at block 630, using profile data, and/or feedback data received in response to content depiction distribution (e.g., described below in reference to block 690).

At block 650, the neural network nodes and connections process the profile preferences and utilize available content structures and/or image data to generate a content depiction at block 660. The content depiction may be an image depiction and/or a content structure which may be used to generate an image depiction for optimal induction of content consumption based upon the profile preferences. At block 670, the content depiction is processed by a discriminator (e.g., discriminator module 240 of FIG. 2). Such as described herein, a discriminator may compare the depicted content to one or more model depictions or depiction properties/attributes. If the comparison fails particular criteria (e.g., such as learned by the discriminator to determine passable/acceptable depictions), the neural network may reprogram itself based upon the failing attributes and regenerate another depiction at block 540 in order to address the failed criteria. The neural network may reprogram itself also based upon passing depictions and "learn" to more efficiently generate passing content depictions.

At block 680, if the content depiction passes discrimination at block 670, the content depiction is distributed such as across a computer network for display in a device associated with the user profile. At block 690, feedback data collected in response to the generated and distributed content depiction is received by the neural network system and used to reprogram the nodes and connections of the network at block 640. For example, connections in the neural network may be modified or reinforced based upon a negative or positive degree of consumption of content in relation to the content depiction.

Figure 7:
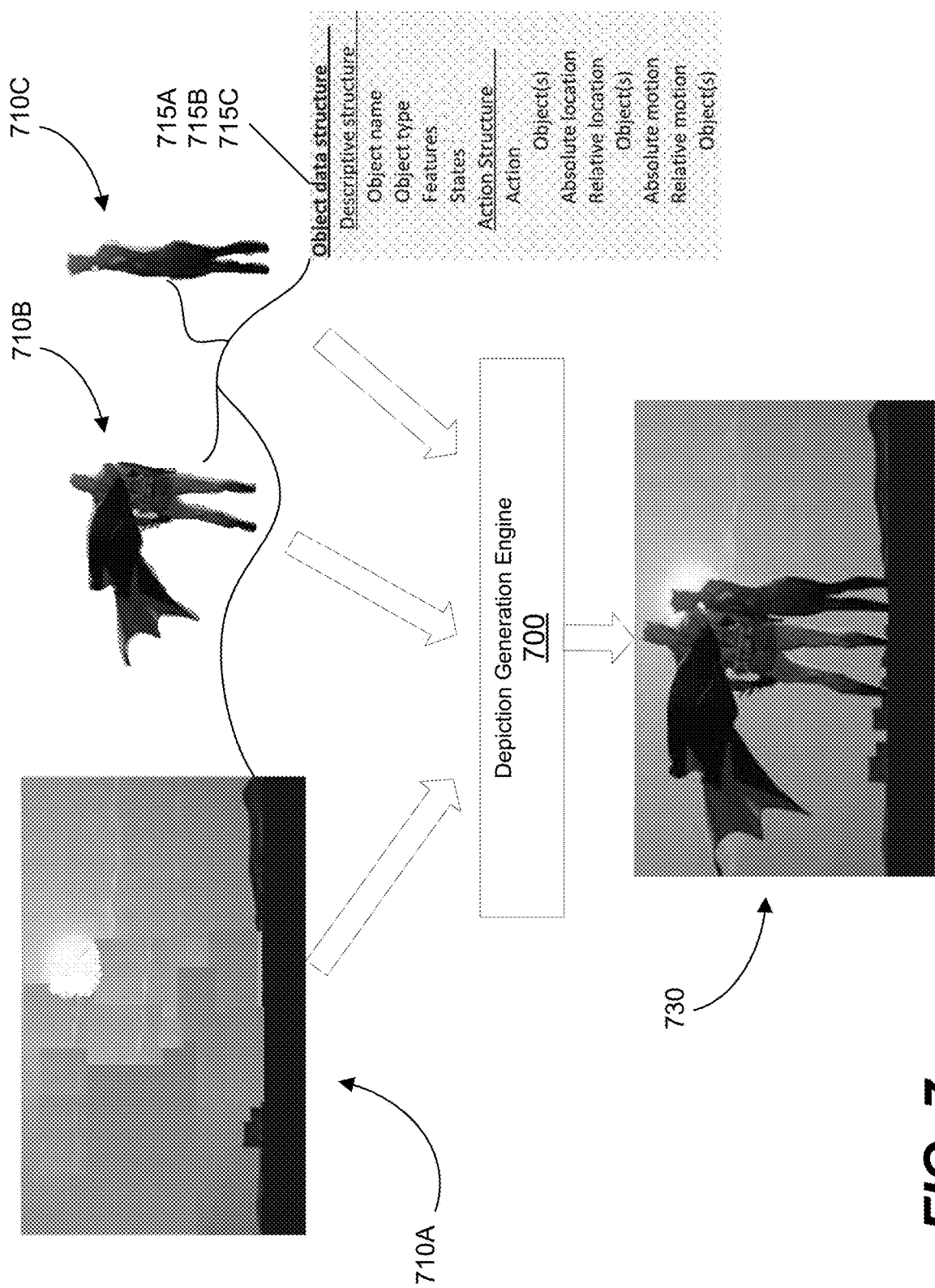
FIG. 7 shows an illustrative process of combining image data to generate a content depiction in accordance with some embodiments of the disclosure.

FIG. 7 shows an illustrative process of combining image/content structure data to generate a content depiction in accordance with some embodiments of the disclosure. In an embodiment, a machine learning/artificial intelligence system generates a content depiction 730 of a content. Data associated with a particular profile is used by the machine learning/artificial intelligence system to tailor the depiction to reflect preferences of the profile. As described in various embodiments herein, a machine learning/artificial intelligence system accesses and/or receives content structures and image data including image data 710A, 710B, and 710C and associated object structures 715A, 715B, and 715C, respectively, for generating a content depiction 730.

Image data/content structures may include image data objects that represent particular characters/actors such as images 710B and 710C, respectively. Image data objects/content structures may include or be defined by associated object data structures 715B and 715C including character attributes or other attributes associated with the images including character roles in a content, gender, relative scales of the images, etc. Object data structures are further described, for example, within the '919 application referenced above.

The input profile data may reflect a preference for one or more of these object attributes, based upon which the system may be directed to generate a depiction including these characters. Additional profile data may reflect a preference for romantic themes, for example, which may further direct the machine learning/artificial intelligence system to generate a depiction with the characters in an embrace and a background representing a romantic theme (e.g., a moonlit night) such as exemplified in image data 710A and associated object structure 715A. An exemplary depiction 730 combining these various attributes may then result from the system to reflect preferences of the profile.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

We claim:

1. A method comprising:
   receiving image data;
   receiving object data;
   retrieving a plurality of verified depictions of content;
   accessing a neural network framework, wherein the neural network framework comprises a generator neural network and a discriminator neural network;
   generating a proposed content depiction, by inputting into the generator neural network of the neural network framework: at least one of the image data, the object data, or the plurality of verified depictions of content;
   determining whether the proposed content depiction is accepted by inputting into the discriminator neural network of the neural network framework: the proposed content depiction generated by the generator neural network, and the plurality of verified depictions of content;
   based on determining that the proposed content depiction is not accepted:
      modifying configurations of the generator neural network of the neural network framework and the discriminator neural network of the neural network framework; and
      repeating the generating and the determining steps;
   based on determining the proposed content depiction is accepted:
      storing the proposed content depiction in a content platform in association with the content; and
      generating for display the stored proposed content depiction on the content platform.

2. The method of claim 1, further comprising:
   causing distribution of the proposed content depiction across a computer network to at least one network device.

3. The method of claim 1, wherein the image data comprises at least one of an image, an image attribute, image metadata, image data obtained from object data, or image data obtained from a depiction.

4. The method of claim 1, wherein the object data comprises at least one of an object name, an object type, an object feature, an object state, an object action, an object absolute location, an object relative location, an object absolute motion, or an object relative motion.

5. The method of claim 1, wherein each of the plurality of verified depictions of content comprises at least one of a poster or an image.

6. The method of claim 1, wherein the generator neural network has an input layer having nodes representing the at least one of the image data, the object data, or the plurality of verified depictions of content, and a processing layer of nodes and connections between them, the nodes and connections programmed and configured to output the proposed content depiction to an output layer.

7. The method of claim 6, wherein the discriminator neural network is programmed to compare the proposed content depiction with features of at least one of the plurality of verified depictions of content.

8. The method of claim 7, wherein the discriminator neural network comprises an input layer of nodes representing the proposed content depiction and the plurality of verified depictions of content, and a processing layer of nodes and connections between them, the nodes and connections programmed and configured to output a determination of whether the proposed content depiction satisfies criteria of an acceptable content depiction.

9. The method of claim 8, wherein the generator neural network and discriminator neural network are trained by feedback data, and wherein the generator neural network is trained by the discriminator neural network for the determination of whether the proposed content depiction satisfies the criteria of the acceptable content depiction.

10. The method of claim 9, wherein the feedback data comprises content consumption tracked in response to distribution of the proposed content depiction.

11. A system comprising:
   circuitry configured to:
      receive image data;
      receive object data;
      retrieve a plurality of verified depictions of content;
      access a neural network framework, wherein the neural network framework comprises a generator neural network and a discriminator neural network;
      generate a proposed content depiction, by inputting into the generator neural network of the neural network framework: at least one of the image data, the object data, or the plurality of verified depictions of content;
      determine whether the proposed content depiction is accepted by inputting into the discriminator neural network of the neural network framework: the proposed content depiction generated by the generator neural network, and the plurality of verified depictions of content;
      based on determining that the proposed content depiction is not accepted:

modify configurations of the generator neural network of the neural network framework and the discriminator neural network of the neural network framework; and repeat the generating and the determining steps;

based on determining the proposed content depiction is accepted:

store the proposed content depiction in a content platform in association with the content; and generate for display the stored proposed content depiction on the content platform.

12. The system of claim 11, wherein the circuitry is configured to:

cause distribution of the proposed content depiction across a computer network to at least one network device.

13. The system of claim 11, wherein the image data comprises at least one of an image, an image attribute, image metadata, image data obtained from object data, or image data obtained from a depiction.

14. The system of claim 11, wherein the object data comprises at least one of an object name, an object type, an object feature, an object state, an object action, an object absolute location, an object relative location, an object absolute motion, or an object relative motion.

15. The system of claim 11, wherein each of the plurality of verified depictions of content comprises at least one of a poster or an image.

16. The system of claim 11, wherein the generator neural network has an input layer having nodes representing the at least one of the image data, the object data, or the plurality of verified depictions of content, and a processing layer of nodes and connections between them, the nodes and connections programmed and configured to output the proposed content depiction to an output layer.

17. The system of claim 16, wherein the discriminator neural network is programmed to compare the proposed content depiction with features of at least one of the plurality of verified depictions of content.

18. The system of claim 17, wherein the discriminator neural network comprises an input layer of nodes representing the proposed content depiction and the plurality of verified depictions of content, and a processing layer of nodes and connections between them, the nodes and connections programmed and configured to output a determination of whether the proposed content depiction satisfies criteria of an acceptable content depiction.

19. The system of claim 18, wherein the generator neural network and discriminator neural network are trained by feedback data, and wherein the generator neural network is trained by the discriminator neural network for the determination of whether the proposed content depiction satisfies the criteria of the acceptable content depiction.

20. The system of claim 19, wherein the feedback data comprises content consumption tracked in response to distribution of the proposed content depiction.

* * * * *